Nov. 28, 1961 R. H. GERHARDT 3,011,164

DIGITAL EXPANSION CIRCUIT

Filed July 25, 1957 3 Sheets-Sheet 1

Nov. 28, 1961 R. H. GERHARDT 3,011,164

DIGITAL EXPANSION CIRCUIT

Filed July 25, 1957 3 Sheets-Sheet 2

3,011,164

DIGITAL EXPANSION CIRCUIT

Robert H. Gerhardt, Bedford, Mass., assignor to Research Corporation, New York, N.Y., a corporation of New York Filed July 25, 1957, Ser. No. 674,198
10 Claims. (Cl. 340—324)

This invention relates to data processing systems and more particularly it relates to expansion circuitry for selectively varying the location of data in relation to a dimension or a predetermined scale of reference by manipulating address information which is encoded in digital form.

In the art of data processing a form of data that is often used is a message that includes address information. This address information permits each message to be dimensionally located with respect to other similar messages. Expansion, as the word is used in this specification, involves the manipulation of this address information to relocate each message with reference to the dimension (*s*) in a systematized manner without change in the form or content of the message. Such expansion is frequently desirable, particularly where certain portions of the available information are more relevant or more significant at a given time than other portions. With the advent of digital computer techniques it has become possible to process tremendous masses of data and the demand for reliable and flexible methods of selecting, handling and utilizing significant portions of available processed data is increasing.

Heretofore, so far as known, analogue expansion has been the principal means utilized to select the most relevant portions of such data. For example, where information, previously encoded in digital form to facilitate its manipulation, is to be displayed on the face of a cathode-ray tube such as the character display device disclosed in McNaney U.S. Patent No. 2,283,383, the address information has been decoded into analogue form and applied to an expansion circuit of the analogue type. Such a circuit amplifies the voltage applied to the deflection apparatus of the cathode-ray tube by a factor equal to the degree of expansion desired. If the voltage level is doubled the weight of the address information in each dimension is doubled and the messages are displayed on the tube face in such expanded form. Of course, certain of the messages (in three-quarters of the total area of the unexpanded two dimensional display) are not displayed as there is insufficient display area available.

When circuitry of this type is utilized with complex cathode-ray tubes which incorporate post acceleration, certain marked disadvantages are present. In post acceleration tubes the electrons in the generated beam are accelerated in the portion of the tube beyond the deflection yoke. When the combination of expansion and post acceleration is used in the cathode-ray tube the analogue expansion circuitry increases the deflection voltages such that electrons are deflected against an interior surface of the tube other than the tube face and, instead of being absorbed, some of these electrons are accelerated by the post-acceleration voltage towards the tube face from their points of contact with a tube surface. These errant electrons produce spurious splashes or similar deceptive or unwanted images in the display area.

Accordingly, it is a primary object of this invention to provide a means to expand information with reference to a predetermined dimension without the production of spurious images or other undesired display phenomena.

Another object of the invention is to provide means incorporating simple and reliable circuitry for the expansion of address information.

Another object of the invention is to provide means whereby a plurality of predetermined degrees of expansion are made available and wherein the selection of a particular degree of expansion is easily accomplished.

Another object of the invention is to provide coordination between the degree of expansion utilized and that portion of the unexpanded dimension from which the message information is selected.

Another object of the invention is to provide expansion circuitry which avoids the use of variable gain amplifiers and hence avoids, for the most part, the problem of drift.

The circuitry of the present invention is adapted to manipulate digitally encoded address information before it is decoded. The desired degree of expansion is obtained by effectively shifting or displacing each address number a predetermined number of places in a manner similar to the operation of multiplying a digital number by a power of its radix. A predetermined number of consecutive digits are transmitted to a decoder or other appropriate device without change in the interrelation between these digits, thereby effectively expanding the address by a factor proportional to the radix in which the word is encoded. However, the maximum output voltage level of the decoder remains the same irrespective of the degree of expansion provided as that portion of the digital address which would produce voltages above this level is not transmitted.

By altering the value of one or more digits in predetermined orders of each address number the position of "expanded" messages relative to a reference may be varied as desired within certain limits which are a function of the degree of expansion and of the radix in which the address is encoded. Groups of messages may be superimposed if desired for comparison purposes. Selection circuitry, included in the circuitries of the invention, is ordinarily required to segregate messages that are to be utilized. The selection circuitry is adapted optionally to sense one or more digits of each address number.

The address information which serves as the input to the subject apparatus may be encoded in any radix. The degree of expansion obtained is proportional to the radix in which the information is encoded. For example, information encoded in the binary radix may be expanded by a factor of two or a multiple thereof, while information encoded in the decimal radix may be expanded by a factor of ten or a multiple thereof. The preferred embodiment of the invention, however, is designed to expand address information encoded in the binary radix as reliable high-speed electronic on-off components adaptable to this radix are available.

The preferred embodiment of the invention is associated with a two-dimensional display of messages on the face of a display tube. The embodiment permits the positioning of messages in expanded interrelation by a factor of two or a multiple thereof. It further permits the selection of one of several different groups of messages in coordination with the desired degree of expansion in a simple, straightforward and easily operated manner. The deflection voltages are limited to that value required for deflection of the electron beam across the display area, and thus troublesome problems due to post acceleration are eliminated. Design problems due to the magnitude of the voltages frequently encountered in analogue expansion circuitries are also reduced. The invention permits the use of constant gain amplifiers with consequent reduction in the problem of compensation for drift or other voltage variations.

Further objects and advantages will become apparent from the following description and accompanying drawings, which disclose the principles associated with the invention and, by way of example, the best mode, as presently contemplated, for applying these principles. In the drawings.

Figure 7:
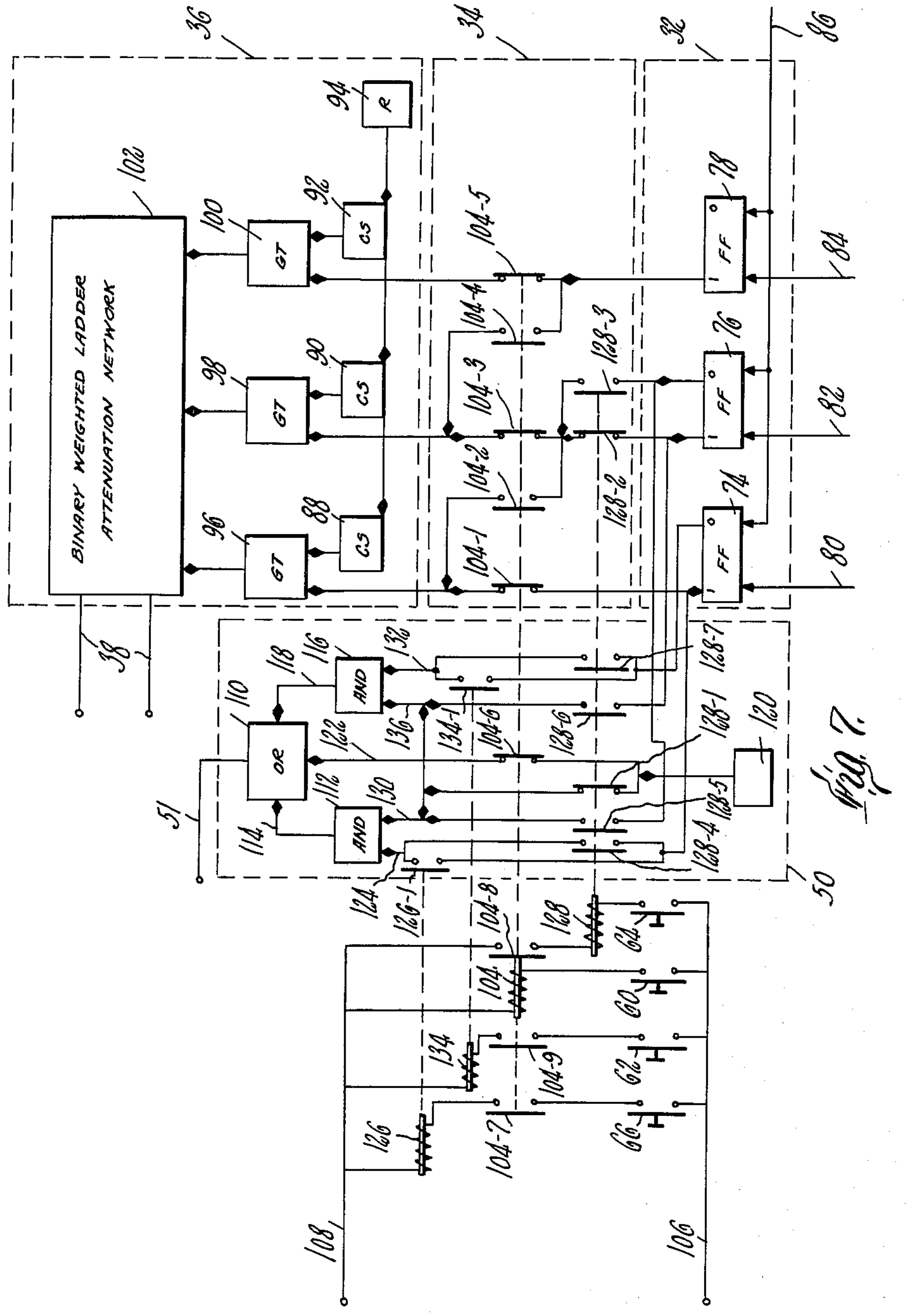
Figure 8:
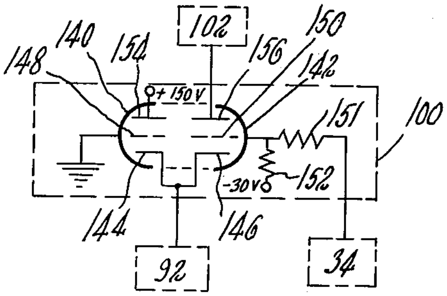

FIGS. *5a–d* are diagrams of the display area illustrating the unexpanded location of messages which may be selected and displayed in expanded form by the use of the basic expansion circuitry;

FIGS. *6a–e* are diagrams of the display area illustrating additional unexpanded location of messages which may be selected and displayed in expanded form by modified expansion circuitry;

FIG. 7 illustrates in simplified form the logical circuitry of a preferred embodiment of the subject invention;

FIG. 8 is a schematic diagram of a current gate circuit; and

Figure 9:
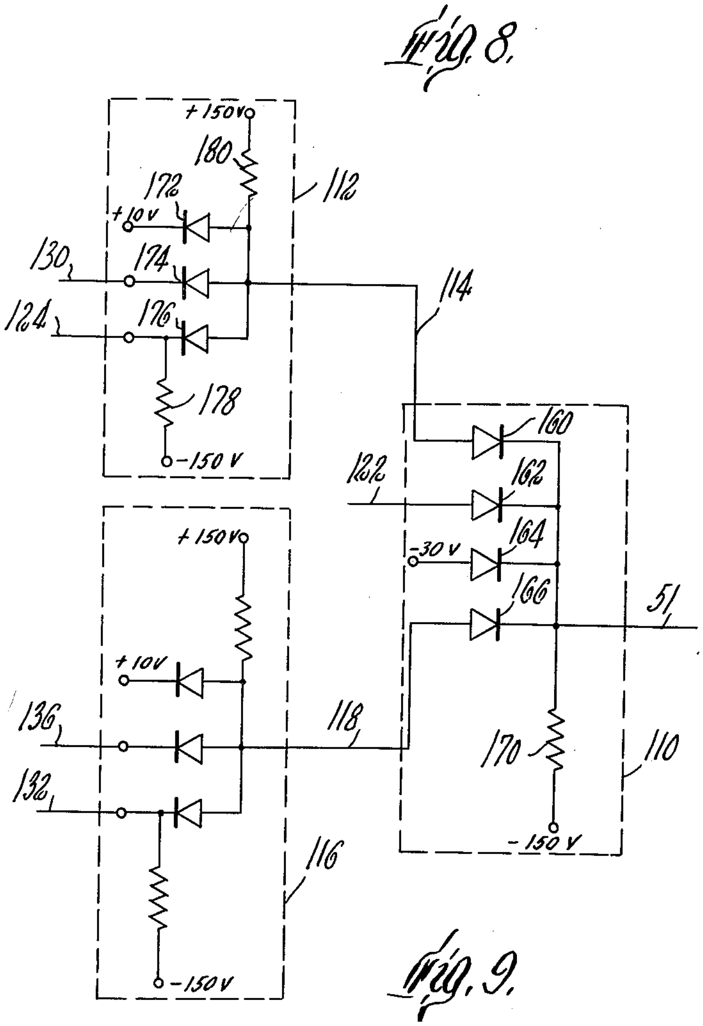

FIG. 9 is a schematic diagram of AND and OR circuits used in the selection circuitry.

Throughout the description and in the accompanying drawings there are certain conventions employed which are familiar to certain of those skilled in the art. Additional information concerning these conventions is as follows:

In the block diagram figures of the drawings a conventional filled-in arrowhead is employed on lines throughout the drawings to indicate (1) a circuit connection, (2) energization with standard positive pulses and (3) the direction of pulse travel which is also the direction of control. A diamond-shaped arrowhead indicates (1) a circuit connection and (2) energization with a D.C. level. Pulses indicated by conventional filled-in arrowheads may be positive going $\frac{1}{10}$ micro-second, half sine, 20 to 40 volts in amplitude. D.C. levels indicated by filled-in diamond-shaped arrowheads may be on the order of 10 volts when positive and 30 volts when negative and the voltage levels indicated by unfilled-in diamond-shaped arrowheads vary in magnitude. The input and output lines of the block symbols are connected to the most convenient sides of the block.

Bold face character symbols appearing within a block identify a common name for the circuit represented, that is, FF identifies a flip-flop, GT a gate circuit, CS a constant current source, R is a regulator, AND a logical and circuit, and OR a logical or circuit.

Figure 1:
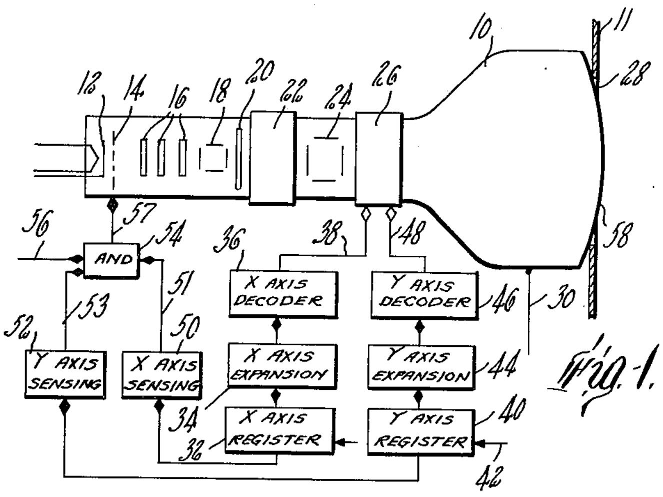
FIG. 1 is a logical block diagram of the expansion and sensing circuitries associated with a display tube in the preferred embodiment of the invention.

Reference is made to FIG. 1 which shows in simplified block form the equipment comprising a preferred embodiment of the invention in association with a display tube 10, which is supported by a suitable mounting structure 11. The electron beam in the display tube 10 originates at the cathode 12, is effectively gated on or off by the control grid 14, and is accelerated and focused by anodes 16. The electron beam is then deflected by a set of character selection plates 18 to a specific aperture of the character forming matrix 20. A convergence coil 22 then acts on the formed electron beam as a magnetic lens to converge the character shaped beam, causing the beam to cross the longitudinal axis of the tube at the approximate position of character compensation plates 24. These plates 24 are used to compensate for the off axis displacement of the beam as a result of the character selection. This character is designated herein as the message. An electromagnetic deflection yoke 26 deflects the beam containing the character of the message to a specific location on the tube face 28 as determined by message positioning voltages. Post acceleration is produced by high voltage anode 30.

X axis message positioning voltages are derived from address information encoded in digital form which is pulsed into register 32 and transmitted through the expansion circuitry 34 and the decoder 36 to the X axis portion of the deflection yoke 26 over leads 38. Similarly, the Y axis message positioning voltages are derived from address information encoded in digital form which is pulsed into register 40 over lead 42 and transmitted through the expansion circuitry 44 and the decoder 46 to the Y axis portion of the deflection yoke 26 over leads 48.

The selection circuitry includes an X axis sensor 50 and a Y axis sensor 52 whose outputs are connected to an AND circuit 54 by leads 51 and 53 respectively. A third lead 56 is also connected to AND circuit 54. The output lead 57 is connected to the control grid 14 of the charactron. The details of the circuits are described in greater detail in connection with FIG. 7.

Figure 2:
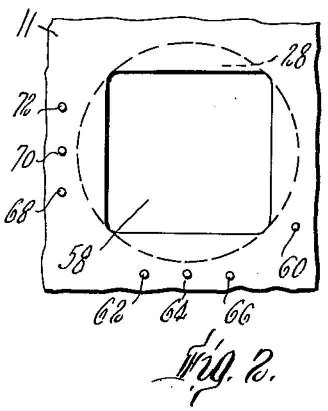
FIG. 2 is a view of the face of the display tube showing the display area and a plurality of control push buttons positioned about that display area.

The face 28 of the display tube 10 and in particular the square display area 58 as defined by the aperture in the support structure 11 is shown in FIG. 2. An expansion push button 60 is positioned to the right of the display area 58, three X axis selection push buttons 62, 64 and 66 are located below the display area and three Y axis selection push buttons 68, 70 and 72 are located to the left of the display area. These selection push buttons are positioned in relation to the associated axis such that each is adjacent that portion of the axis which is selected when that push button is depressed.

Reference is made now to FIG. 7 which shows in simplified form the expansion and selection circuitry for operation upon the X axis addresses of the messages. The Y axis expansion and selection circuitry is substantially identical to the X axis circuitry and therefore the detailed description will be limited to the circuitry associated with the X axis.

The address register 32 consists of three flip-flops 74, 76 and 78, which may be of the type shown in FIG. 21 of copending patent application Serial Number 494,-982 entitled "Magnetic Data Storage" filed March 11, 1955, by H. K. Rising et al. Binary information is applied through conductors 80, 82 and 84 to flip-flops 74, 76 and 78 respectively. A pulse over conductor 86 is used to reset the flip-flops in the address register following each individual address selection. Flip-flops 74, 76 and 78 are of the type wherein a positive pulse of relatively short duration applied to the "1" or "0" input produces a positive D.C. level of approximately plus ten volts on the corresponding output and a negative D.C. level of approximately minus thirty volts on the opposite output.

Figure 3:
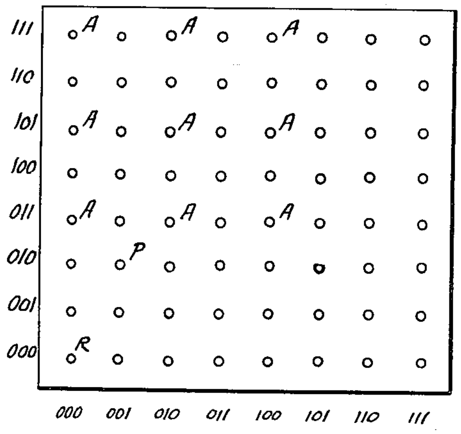
FIG. 3 is a view of the display area illustrating the available message positions in an unexpanded display.

The digital to analogue decoder 36, in simplified form, consists of three constant current source tubes 88, 90 and 92, a voltage regulator 94 which provides a constant voltage to the constant current source tubes, three current gate circuits 96, 98 and 100 and a binary weighted ladder attenuation network 102. The voltage regulator 94 which may be of the type shown in FIG. 2 of copending patent application Serial Number 595,993 entitled "Digital to Analogue Decoder Circuits" filed July 5, 1956, by J. I. Woolf et al., is a stabilized voltage source which maintains a constant bias on the control grids of the current source tubes 88, 90, and 92 despite variations in line potential. A suitable constant current source is shown in FIG. 3 of copending patent application Serial Number 603,035 entitled "Digital Analogue Multiplier" filed August 9, 1956, by J. I. Woolf et al. Constant current is available to the attenuation network 102 from each of the current sources as controlled by the associated current gate circuit.

A suitable current gate tube circuit (gate 100 is selected for purposes of this description) is shown in FIG. 8 and consists of two triodes 140 and 142. Current from the constant current source 92 is applied to cathodes 144 and 146 of tubes 140 and 142 respectively. The grid 148 of the tube 140 is grounded and the grid 150 of tube 142 is connected through a 10 kilohm resistor 151 to the expansion circuitry 34. If the potential on grid 150 is +10 volts, corresponding to a binary 1, tube 142 conducts, thereby preventing companion tube 140 from conducting. If the potential on grid 150 is −30 volts, corresponding to binary 0, conduction is terminated in tube 142 and tube 140 conducts. Grid 150 is also connected to a −30 volt source through a 1 megohm resistor 152. Thus, if the grid lead to the expansion circuitry should be open the potential on grid 150 would still be held below that of grid 148 and tube 140 would conduct while tube 142 would not. The anode 154 of tube 140 is connected to a +150 volt source and the anode 156 of tube 142 is connected to the ladder attenuation network 102. Thus, the current gate circuits will conduct current from each associated current source tube to the associated ladder section only when a positive voltage is impressed on the grid of the tube connected to the attenuation network 102. The gate circuits also prevent changes in the state of the connected flip-flop which might result from the voltage variations in the attenuation network. The binary ladder attenuation network 102 consists of a series of symmetrical sections designed to produce the required relation of the voltage drops from section to section, for example, as described and illustrated in Terman Radio Engineer's Handbook, 1st ed. 1943, pages 215–217. In the instant case equal currents are supplied by the current sources 88, 90 and 92. The current from source 88 impresses a unit voltage on lines 38, the current from source 90 impresses a one-half unit voltage on lines 38 and the current from source 92 impresses a one-quarter unit voltage on lines 38. By this means a signal encoded in binary form is decoded into an analogue voltage.

The expansion circuitry 34, connected between the register 32 and the decoder 36, consists of contacts 104–1, 104–2, 104–3, 104–4 and 104–5 associated with solenoid coil 104 and contacts 128–2 and 128–3 associated with solenoid coil 128. (The function of coil 128 will be treated in detail hereinafter and in the instant discussion it will be considered as deenergized.) Solenoid coil 104 is connected across lines 106 and 108 and is energized by the depression of the expansion push button 60. When coil 104 is deenergized the "1" terminal of flip-flop 74 is connected to gate tube 96 through contacts 104–1, the "1" terminal of flip-flop 76 is connected to gate tube 98 through contacts 104–3 and the "1" terminal of flip-flop 78 is connected to gate tube 100 through contacts 104–5. When coil 104 is energized the output terminals of flip-flop 74 are not connected to any gate tube, and the "1" terminal of flip-flop 76 is connected to gate tube 96 through contacts 104–2 and the "1" terminal of flip-flop 78 is connected to gate tube 98 through contacts 104–4. (In this embodiment no flip-flop is connected to gate tube 100 when the coil 104 is energized. This portion of the circuit may be utilized, when desired, by the provision of an additional flip-flop in the register 32.)

In this embodiment, incorporating a two-dimensional display of messages which are positioned relative to each axis by address information consisting of three digit binary numbers, there are sixty-four available message positions in the unexpanded display, as shown in FIG. 3. The binary numbers which produce the corresponding X axis voltages are indicated by the legend below FIG. 3 and the binary numbers which produce corresponding Y axis voltages are indicated by the legend to the left of FIG. 3. The dots on FIG. 3 indicate the sixty-four possible addresses of messages. For example, the binary number 001 in the X axis register 32 produces a one-quarter unit voltage and deflects the electron beam to a point on the line above that number (FIG. 3). If 001 is the X address of a message which has a Y axis address number 010 (producing a one-half unit voltage) the message is located at point P. (It is to be noted that the electron beam is initially deflected to point R (000,000) by auxiliary means and the address numbers generate message positioning voltages of the opposite polarity.)

When the expansion relay 104 is energized the flip-flop 74, containing the most significant digit of each binary address number, is disconnected from the decoder 34 and each of the other flip-flops 76, 78 is connected to the next higher channel of the decoder than it was previously connected. Thus the number 001, which produced a one-quarter unit voltage when the expansion relay was deenergized, produces a one-half unit voltage and the number 010, which produced a one-half unit voltage produces a unit voltage. However, the number 101, which produced a one and one-quarter unit voltage, now produces a one-half unit voltage. The relation between the address numbers and the voltage output with the expansion of relay 104 deenergized and energized is indicated in Table 1.

*Table 1*

| Address Number | Unit voltage | |
|---|---|---|
| | Relay 104 De-energized | Relay 104 Energized |
| 000 | 0 | 0 |
| 001 | 1/4 | 1/2 |
| 010 | 1/2 | 1 |
| 011 | 3/4 | 1 1/2 |
| 100 | 1 | 0 |
| 101 | 1 1/4 | 1/2 |
| 110 | 1 1/2 | 1 |
| 111 | 1 3/4 | 1 1/2 |

It will be seen from the above table that the weight of the address numbers is changed in a predetermined manner as follows: The voltages produced by the numbers 000–011 are doubled. The voltages produced by the numbers 100–111 are referred to the same zero point as the 000–011 voltages and within this group the relative voltages are also doubled. Thus, the message positions have been expanded by a factor of two without exceeding the maximum voltage of the unexpanded display. If simple binary multiplication were utilized half the addresses per axis would produce excessive voltages.

Figure 4:
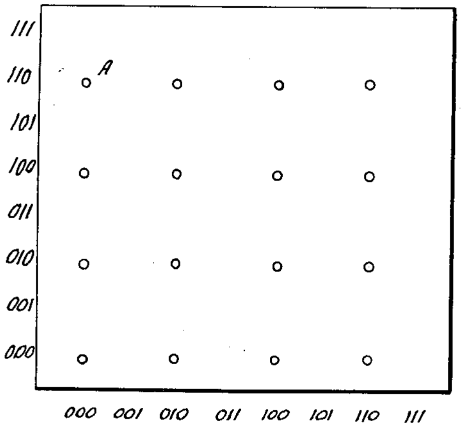
FIG. 4 is a view of the display area showing the available message positions in an expanded display.
Figure 5A:
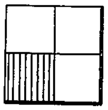

The location of messages in an expanded display is shown in FIG. 4. As the address information available to the decoder now consists of a two digit binary number per axis there are only sixteen available message positions, as shown in FIG. 4. A message in an expanded two dimensional display shares the same address with three other messages. For example, the points having unexpanded addresses of 000,111; 000,011; 100,111; and 100,011 would all appear at the point having the address 000,110 when relay 104 was energized. Effectively the four quadrants of the unexpanded display (indicated in shading the FIGS. 5*a*, *b*, *c* and *d*) are superimposed upon one another. A means to select the most relevant quadrant for expanded display will ordinarily be required, although for some applications involving comparison of data superposition may be desirable.

Figure 5B:
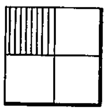
Figure 5C:
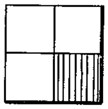
Figure 5D:
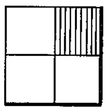

In the preferred embodiment the selection means operates on the principle that messages in the desired quadrant may be identified by the most significant binary digit of each address number where there is an expansion by a factor of two. The most significant digit of both the X and Y address numbers of messages located in the lower left quadrant (FIG. 5*a*) are zeros. Similarly, the most significant X axis address digit of messages located in the upper left quadrant (FIG. 5*b*) is a zero and the most significant Y axis address digit is a one. The selection means is adapted to sense the flip-flop which stores the most significant digit in each address number and to control the voltage on the grid 14 of the display tube such that the generation of an electron beam to display a message is permitted only when the address numbers of that message have the selected combination of those digits.

The selection means is controlled by push buttons, push button 62 selecting messages having X axis addresses in which the most significant digit is a zero, push button 66 selecting messages having a most significant X axis address digit of one; push button 68 selecting messages having a most significant Y axis address digit of zero and push button 72 selecting messages having a most significant Y axis address digit of one. The push buttons are mechanically interlocked so that only one push button per axis may be in depressed condition at any one time.

The logical circuitry of the selection means, shown in FIG. 7, consists of an OR gate 110 which is connected to AND circuit 112 by means of lead 114, to AND circuit 116 by means of lead 118 and to a positive voltage source 120 by means of lead 122. When the expansion relay 104 is deenergized the OR gate 110 always has a positive voltage output as it is conditioned by the positive voltage from source 120 through contacts 104–6 and lead 122.

When the relay 104 is energized the OR gate 110 has a positive output only if there is a positive signal from either AND circuit 112 or AND circuit 116 as the contacts 104–6 are open, disconnecting lead 122 from the voltage source 120. In the described embodiment the AND circuits are of a type that have a negative voltage output when an input lead is open or negative and have a positive voltage output only when the voltages of both inputs are positive. AND circuit 112 is connected to the "1" terminal of flip-flop 74 through lead 124 and contacts 126–1 and to the positive voltage source 120 through contacts 128–1 and lead 130. AND circuit 116 is connected to the "0" terminal of flip-flop 74 through lead 132 and contacts 134–1 and to the voltage source 120 through contacts 128–1 and lead 136.

The AND and OR circuitry used in the selection means is shown schematically in FIG. 9. The OR circuit 110 consists of four diodes 160, 162, 164, 166, the terminals on one side of which are connected respectively to input leads 114, 118 and 122 and to a —30 volt source. The opposite terminals of these diodes are connected to output lead 51. Lead 51 is also connected to a potential of —150 volts through a 180 kilohm resistor 170. The OR circuit will have a positive output voltage whenever there is a positive voltage on any one of the input leads.

AND circuits 112 and 116 are identical. AND circuit 112 consists of three diodes 172, 174, and 176 the terminals on one side of which are connected to lead 114. The opposite terminal of diode 172 is connected to a clamping potential of +10 volts, the opposite terminal of diode 174 is connected to input lead 130 and that of diode 176 is connected to input lead 124. As lead 124 may be open part of the time it is also connected to a potential of —150 volts through a 100 kilohm resistor 178. A potential of +150 volts is also connected to lead 114 through a 150 kilohm resistor 180. The AND circuit 112 will not have a positive output unless there is a positive voltage on both of leads 124 and 130. Likewise, AND circuit 116 will not have a positive output unless there is a positive voltage on both of leads 132 and 136.

Solenoid coils 126, 128 and 134 are in series with contacts 104–7, 104–8 and 104–9 respectively and therefore cannot be energized unless the expansion relay 104 is energized. If messages in the left half of the unexpanded display (FIG. 3) are desired for expanded display push button 60 is depressed (energizing relay coil 104) and push button 62 is depressed, energizing coil 134, closing contacts 134–1 and connecting the AND circuit 116 to the "0" terminal of flip-flop 74. As lead 136 of AND circuit 116 is connected to the voltage source 120 through contacts 128–1 the OR gate 110 will have an output produced by a signal from AND circuit 116 when the most significant digit in the X axis address number is a zero as the flip-flop 74, in the zero condition impresses a positive voltage on lead 132. AND circuit 112 will not produce a signal as contacts 126–1, in series with lead 124, are open.

Similarly, if the right half of the unexpanded display is to be selected push button 66 is depressed, energizing coil 126 and also de-energizing coil 134 through the mechanical interlock operation of push button 62. AND circuit 112 is connected to the "1" terminal of flip-flop 74 through lead 124 and contacts 126–1 and to the voltage source 120 through contacts 128–1 and lead 130. The OR gate 110 will have a positive output only when the most significant digit in the X axis address number is a one.

The outputs of the X axis sensing circuit and the Y axis sensing circuit are connected to an AND circuit 54 as shown in FIG. 1. When the X axis and the Y axis address numbers of the message have the proper significant digits as determined by which push buttons are depressed and an intensification signal appears on lead 56 the AND circuit 54 has a positive output. This output voltage drives the grid 14 positively and permits the generation of an electron beam to form and display the message in a location as determined by the message positioning voltages impressed on the deflection yoke 26.

Figure 6A:
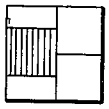
Figure 6B:
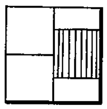
Figure 6C:
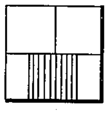
Figure 6D:
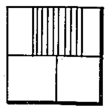
Figure 6E:
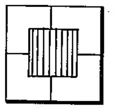

Advantageous expanded message displays frequently include portions of more than one quadrant, such as messages positioned in the vicinity of the center of the unexpanded display. The circuitry of this embodiment provides the same degree of expansion of a portion of the unexpanded display equal in size to a quadrant and derived from one of the shaded areas illustrated in FIGS. 6*a*, *b*, *c*, *d* and *e*. A message positioned in the selected shaded portion of the unexpanded display is repositioned in the expanded display at one of the sixteen addresses shown in FIG. 4.

This group of expanded message displays (FIG. 4) is achieved by altering the weight of the digits in the most significant channel of the decoder and sensing the digits in that channel in addition to the digits in the more significant channels for the selection of the desired portions of the messages. In the described embodiment the weight accorded the digits in the most significant flip-flop connected to the decoder is reversed. This action is instituted in the X axis circuitry by the depression of push button 64 and in the Y axis circuitry by the depression of push button 70. This selects the center portion of the unexpanded axis for expanded display.

With reference to FIG. 7 push button 64 will energize coil 128 only when the expansion relay coil 104 has been energized by the depression of push button 60 (closing the interlock contacts 104–8). When coil 128 is energized the "1" terminal of flip-flop 76 is disconnected from gate tube 96 by the opening of contacts 128–2 and the "0" terminal of flip-flop 76 is connected to gate tube 96 through contacts 128–3 and contacts 104–2. Thus the number 010 which produced a one-half unit voltage when the expansion relay 104 was de-energized, produces a zero voltage when the expansion relay 104 is energized and push button 64 is depressed; and the number 011, which produced a three-quarter unit voltage when the expansion relay 104 was de-energized produces a one-half unit voltage when the expansion relay is energized and push button 64 is depressed. The relationship between the address numbers and the voltage output with relays 104 and 128 is energized and de-energized is indicated in Table 2.

*Table 2*

| Address Number | Unit Voltage | |
|---|---|---|
| | Relays 104 and 128 De-energized | Relays 104 and 128 Energized |
| 000 | 0 | 1 |
| 001 | ¼ | 1½ |
| 010 | ½ | 0 |
| 011 | ¾ | ½ |
| 100 | 1 | 1 |
| 101 | 1¼ | 1½ |
| 110 | 1½ | 0 |
| 111 | 1¾ | ½ |

The voltages produced by the numbers 010 through 101 are referred to the same zero point as were the number 000–011 and 100–111 (Table 1) and the relative voltages within this group are similarly doubled.

It is noted that the address numbers of interest are 010, 011, 100 and 101. These are characterized by the digit combination in the two most significant orders of 01 or 10. The sensing circuitry is connected to permit intensification of only those messages having addresses which fulfill this criterion. Thus, the depression of push button 64, in addition to opening contacts 128–2 and closing contacts 128–3 in the expansion circuitry, opens contacts 128–1 and closes contacts 128–4, 128–5, 128–6 and 128–7 in the selection circuitry. Lead 124 of AND circuit 112 is connected to the "1" terminal of flip-flop 74 through contacts 128–4, and lead 130 is connected to the "0" terminal of flip-flop 76 through contacts 128–5. Lead 132 of AND circuit 116 is connected to the "0" terminal of flip-flop 74 through contacts 128–7 and lead 136 is connected to the "1" terminal of flip-flop 76 through contacts 128–6. Thus, the OR gate 110 will have a positive output only if the two most significant digits of the address number are 10 (providing a positive signal from AND circuit 112) or 01 (providing a positive signal from AND circuit 116). This output is used in a similar manner to control the generation of the electron beam through AND circuit 54 and control grid 14.

In recapitulation, there are sixty-four different message positions available in the unexpanded display, as shown in FIG. 3, and sixteen different message positions in the expanded display as shown in FIG. 4. The depression of push buttons 62 and 68 select the shaded area of the unexpanded display shown in FIG. *5a*, push buttons 62 and 72 select area *5b*, push buttons 66 and 68 select area *5c*, and push buttons 66 and 72 select area *5d*, push buttons 62 and 70 select area *6a*, push buttons 66 and 70 select area *6b*, push buttons 64 and 68 select area *6c*, push buttons 64 and 72 select area *6d*, and push buttons 64 and 70 select area *6e*. A message, positioned at point A in the expanded display (FIG. 4), may be derived from any one of the nine positions indicated by point A in the unexpanded display (FIG. 3).

It may be seen that the principles of this invention are applicable to the handling of address information encoded in other radices. A greater number of decoder and register channels may be provided and a plurality of expansion ratios may be utilized. Expansion and sensing circuitry incorporating the principles of the invention has been constructed in which a thirteen channel address register and a ten channel decoder are utilized and in which provision is made for linear expansion ratios of two, four and eight times. A maximum of four channels may be sensed and means are provided for inverting the values of the binary digits in the most significant channel of the decoder to increase the flexibility of the apparatus. Although the principles of the invention are advantageously utilized with visual display devices, they are also useful in other data handling applications and, in appropriate applications, may be used in conjunction with recording devices or servo systems.

It will be understood that while there has been shown and described a preferred embodiment, the invention is not intended to be limited thereby, or to all details thereof, and departures may be made therefrom within the spirit and scope of the invention as set forth in the appended claims.

I claim:

1. In a data processing system which includes display means for producing a visual display representative of data messages at predetermined different normal locations in a display area and means for operatively supplying to said display means successive groups of signals representing such messages and their normal display addresses, each said display address signal being digitally encoded and having a predetermined plurality of signal values representing digits arranged in a series of orders of increasing significance, the combination of expansion means for arithmetically manipulating said digitally encoded normal address signals to produce related address signals that are expanded functions of said normal address signals, said related address signals being operable to cause said display means to expand the display in a selected portion of said display area by displaying certain of said messages whose normal addresses lie within said selected portion of said area in other portions of said area in locations corresponding to the normal address signals of other messages, and means for preventing display by said display means of said other messages during operation of said expansion means.

2. In a data processing system which includes display means for producing a visual display representative of data messages at predetermined differing normal locations in a display area and means for operatively supplying to said display means successive groups of signals representing such messages and their normal display addresses, each said display address signal being digitally encoded and having a plurality of signal values representing a predetermined plurality of digits arranged in a series of orders of increasing significance, the combination of expansion means operable to cause said display means to expand the display in a selected portion of said display area by displaying certain of said messages whose normal addresses lie within said selected portion of said area in other portions of said area in locations corresponding to the normal address signals of other messages, and means responsive to the digit value in a predetermined order of said address signals for preventing display by said display means of said other messages during operation of said expansion means.

3. In a data processing system which includes display means for producing a visual display representative of data messages at different normal locations in a display area, data manipulation apparatus for processing groups of digitally encoded data signals for controlling display of said data messages in said display area, each of said groups representing a predetermined plurality of digits arranged in a series of orders of increasing significance comprising a digital to analogue decoder having a plurality of channels corresponding in number to the number of digits in each of said groups, said decoder being arranged to produce an output signal representative of the value of the digits applied to said channels for controlling operation of said display means, first means to enter the data signals in a group in the corresponding channels of said decoder to produce an output signal which is an unexpanded function of the original value of said data signals, second means operative alternatively to said first means to selectively enter in said decoder the data signals representing a set of consecutive digits in a series of consecutive channels of said decoder to produce an output signal which is an expanded function of the original value of said data signals, and means responsive to selection of said second means to prevent display by said display means of other data messages during operation of said second means.

4. The apparatus according to claim 3 and further inluding means responsive to selection of said second ıeans optionally to enter in a decoder channel a sub-:itute data signal in place of the data signal representing digit in a predetermined order of each group selected to e entered in said decoder by said second means, said ıbstitute data signal representing a predetermined ınction of the digit in said predetermined order.

5. The apparatus according to claim 3 wherein said isplay preventing means is responsive to the data signal ɘpresenting a digit in a predetermined order in each roup.

6. In a data processing system which includes display ıeans for producing a visual display representative of ata messages at different normal locations in a display rea, data manipulation apparatus for processing groups f binary encoded data signals for controlling display of aid data messages in said display area, each of said roups including a predetermined plurality of digits aranged in a series of orders of increasing significance omprising a binary weighted digital to analogue decoder aving a plurality of channels corresponding in number ɔ the number of digits in each of said groups, said deoder being arranged to produce an output signal repreentative of the value of the digits applied to said chanıels for controlling operation of said display means, a torage register having at least as many channels as said lecoder, a bistable device associated with each register hannel, means to store a group of said binary encoded lata signals in the bistable devices of said register, first neans to enter the data signals stored in said register in he corresponding channels of said decoder to produce n output signal which is an unexpanded function of the riginal value of said data signals, second means operaive alternatively to said first means to selectively enter n said decoder a group of consecutive digits stored in aid register in a series of consecutive channels of said lecoder to produce an output signal which is an expanded unction of the original value of said data signals, and neans responsive to selection of said second means and esponsive to the signal value in a predetermined order of each group stored in said register and selected to be ntered in said decoder by said second means to selectively revent display by said display means of the data message ıssociated with each group having a particular signal value in said predetermined order during operation of aid second means.

7. The apparatus according to claim 6 and further ncluding means responsive to selection of said second neans optionally to enter in a decoder channel a substiute signal value in place of the signal value in a predeermined order of each group selected to be entered in aid decoder by said second means, said substitute signal value being a predetermined function of the signal value n said predetermined order.

8. In a data processing system which includes display neans for producing a visual display representative of lata messages at predetermined different normal locaions in a display area and means for operatively supplyng to said display means successive groups of signals epresenting such messages and their normal display adlresses, the combination of expansion means including neans to shift address signal messages at least one order ɔperable to cause said display means to expand the dislay in a selected portion of said display area by displayng certain of said messages whose normal addresses lie within said selected portion of said area in other portions of said area in locations corresponding to the normal address signals of other messages, and means for preventing display by said display means of said other messages during operation of said expansion means.

9. A two dimensional visual display system including a cathode-ray tube wherein data containing messages are positioned at predetermined locations on the face of said cathode-ray tube by message positioning voltages derived from address information associated with said messages, a grid to control the generation of the electron beam in said cathode-ray tube, deflection means in said cathode-ray tube to position said beam within said tube, a digital to analogue decoder associated with each dimension of display to provide voltages for said deflection means, each of said decoders having a plurality of channels corresponding to the weights of digits, a digital register having at least as many channels as said decoder, each channel comprising a bistable device corresponding to a binary order, each said bistable device adapted to provide a predetermined output signal at one of said terminals in accordance with the condition of said device, means to provide address information in binary form to said register to condition said devices, means selectively to connect the first terminals of first and second consecutive groups of bistable devices to respective channels of said decoder, said first group including a bistable device corresponding to a higher binary order than said second group, means to sense each digit in the bistable device corresponding to the highest binary order in said register and means responsive to said sensed digit to control the voltage impressed on said grid to suppress messages having unexpanded message locations in predetermined portions of the display area.

10. In a system for processing data in the form of messages having binary address information associated therewith, the combination including a register comprising a plurality of bistable devices corresponding to the binary orders of said address information, each of said devices having a first and second terminal, and each of said devices being adapted to provide a predetermined binary output signal at one of said terminals depending upon the condition of said device, means to provide said address information to said register to condition said devices, a decoder comprising a binary weighted ladder attenuation network having a plurality of sections, a constant current source associated with each section to provide a voltage drop across each section corresponding to the binary weight accorded said section, and a gating device responsive to said predetermined binary output signal to control the flow of current from each of said sources to the associated section, means to connect the first terminals of a first group of consecutive bistable devices to respective channels of the decoder and relay means to disconnect the first terminals of said first group from said decoder and to connect a second group of consecutive bistable devices to said respective channels of said decoder, said first group including a bistable device corresponding to a higher binary order than said second group to vary the analogue value of said address information.

References Cited in the file of this patent

UNITED STATES PATENTS

| | | |
|---|---|---|
| 2,347,008 | Vance | Apr. 18, 1944 |
| 2,368,448 | Cook | Jan. 30, 1945 |
| 2,728,906 | Rea | Dec. 27, 1955 |
| 2,737,654 | Tasker | Mar. 6, 1956 |
| 2,836,812 | Flyer | May 27, 1958 |